US008324324B2

(12) United States Patent
Yang et al.

(10) Patent No.: US 8,324,324 B2
(45) Date of Patent: *Dec. 4, 2012

(54) COMPOSITION AND PROCESS FOR PREPARING CURABLE ORGANOFLUORINE-MODIFIED POLYSILAZANES, AND POLYSILAZANES PREPARED THEREBY

(75) Inventors: Yu Yang, Eden Prairie, MN (US); George G. I. Moore, Afton, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/792,065

(22) Filed: Jun. 2, 2010

(65) Prior Publication Data
US 2010/0331498 A1 Dec. 30, 2010

Related U.S. Application Data

(60) Provisional application No. 61/221,574, filed on Jun. 30, 2009, provisional application No. 61/221,575, filed on Jun. 30, 2009.

(51) Int. Cl.
*C08F 283/00* (2006.01)
*C08G 77/62* (2006.01)
(52) U.S. Cl. ........ 525/474; 525/476; 525/477; 525/479; 528/25; 528/26; 528/27; 528/28; 528/29
(58) Field of Classification Search .................. 525/474, 525/476, 477, 479; 528/25–29
See application file for complete search history.

(56) References Cited

U.S. PATENT DOCUMENTS

| | | | |
|---|---|---|---|
| 2,823,218 A | 2/1958 | Speier et al. | |
| 2,970,150 A | 1/1961 | Bailey | |
| 3,159,601 A | 12/1964 | Ashby | |
| 3,159,662 A | 12/1964 | Ashby | |
| 3,220,972 A | 11/1965 | Lamoreaux | |
| 3,250,808 A | 5/1966 | Moore et al. | |
| 3,516,946 A | 6/1970 | Modic | |
| 3,814,730 A | 6/1974 | Karstedt | |
| 4,029,629 A | 6/1977 | Jeram | |
| 4,469,522 A * | 9/1984 | Matsumoto | 524/588 |
| 4,504,645 A | 3/1985 | Melancon | |
| 4,510,094 A | 4/1985 | Drahnak | |
| 4,530,879 A | 7/1985 | Drahnak | |
| 4,533,575 A | 8/1985 | Melancon | |
| 4,678,688 A * | 7/1987 | Itoh et al. | 427/387 |
| 4,845,268 A | 7/1989 | Ohsaka et al. | |
| 4,904,417 A | 2/1990 | Ohsaka et al. | |
| 4,929,704 A | 5/1990 | Schwark | |
| 5,001,090 A | 3/1991 | Schwark | |
| 5,008,422 A * | 4/1991 | Blum et al. | 556/412 |
| 5,021,533 A | 6/1991 | Schwark | |
| 5,032,649 A | 7/1991 | Schwark | |
| 5,145,886 A | 9/1992 | Oxman et al. | |
| 5,206,327 A | 4/1993 | Matsumoto et al. | |
| 5,344,907 A | 9/1994 | Schwark et al. | |
| 5,354,922 A | 10/1994 | Marchionni et al. | |
| 5,386,006 A | 1/1995 | Matsumoto | |
| 5,464,918 A | 11/1995 | Schwark | |
| 5,520,978 A | 5/1996 | Boardman et al. | |
| 5,558,908 A | 9/1996 | Lukacs et al. | |
| 5,616,650 A | 4/1997 | Becker et al. | |
| 5,637,641 A | 6/1997 | Becker et al. | |
| 5,741,552 A | 4/1998 | Takayama et al. | |
| 5,747,623 A | 5/1998 | Matsuo et al. | |
| 5,843,526 A | 12/1998 | Lukacs et al. | |
| 6,165,551 A | 12/2000 | Lukacs et al. | |
| 6,329,487 B1 | 12/2001 | Abel et al. | |
| 6,534,184 B2 | 3/2003 | Knasiak et al. | |
| 6,652,978 B2 | 11/2003 | Lukacs, III et al. | |
| 6,664,354 B2 | 12/2003 | Savu et al. | |
| 6,756,469 B2 | 6/2004 | Lukacs, III | |
| 7,294,731 B1 | 11/2007 | Flynn et al. | |
| 7,335,786 B1 | 2/2008 | Iyer et al. | |
| 7,345,123 B2 | 3/2008 | Qiu et al. | |
| 2002/0105728 A1 | 8/2002 | Yamaguchi et al. | |
| 2003/0013923 A1 | 1/2003 | Marchionni et al. | |
| 2005/0054804 A1 | 3/2005 | Dams et al. | |
| 2005/0250921 A1 | 11/2005 | Qiu et al. | |
| 2006/0246221 A1 | 11/2006 | Falk et al. | |
| 2007/0254975 A1 | 11/2007 | Arney et al. | |
| 2008/0220264 A1 | 9/2008 | Iyer et al. | |

(Continued)

FOREIGN PATENT DOCUMENTS

JP 03/290437 12/1991

(Continued)

OTHER PUBLICATIONS

Machine Translation of JP 08027425 A.*
Kubo et al., "Preparation of Hot Water-Resistant Silica Thin Films from Polysilazane Solution at Room Temperature," Journal of Sol-Gel Science and Technology 31, 257-261 (2004).

(Continued)

*Primary Examiner* — Randy Gulakowski
*Assistant Examiner* — Mike M Dollinger
(74) *Attorney, Agent, or Firm* — Lucy C. Weiss

(57) ABSTRACT

A composition for preparing curable organofluorine-modified polysilazanes comprises (a) at least one curable oligomeric or polymeric polysilazane comprising at least one chemically reactive site; and (b) at least one fluorochemical compound comprising
(1) at least one organofluorine or heteroorganofluorine moiety, and
(2) at least one functional group that is capable of reacting with the curable oligomeric or polymeric polysilazane through at least one of the chemically reactive sites of the polysilazane.

The curable organofluorine-modified polysilazanes can be prepared by combining the components of the composition and allowing or inducing the components to react.

18 Claims, No Drawings

U.S. PATENT DOCUMENTS

2010/0015453 A1 1/2010 Yamaguchi et al.
2010/0331487 A1 12/2010 Yang et al.

FOREIGN PATENT DOCUMENTS

| JP | 03290437 A | * | 12/1991 |
| JP | 07/196987 | | 8/1995 |
| JP | 08027425 A | * | 1/1996 |
| JP | H08-027425 | | 1/1996 |
| JP | 10026703 A | * | 1/1998 |
| WO | WO 02/44264 | | 6/2002 |
| WO | WO 2011/002668 | | 1/2011 |

OTHER PUBLICATIONS

C. Vu et al., "Advanced Coating Materials Based on Polysilazanes," paper presented at The Nurnberg Congress, European Coating Show 2007, May 7, 2007.

International Search Report, PCT/US2010/039894, International Filing Date Jun. 25, 2010.

International Patent Application No. PCT/US2010/060781, "Process for Preparing Shelf-Stable Curable Polysilazanes, and Polysilazanes Prepared Thereby," International Filing Date Dec. 16, 2010.

* cited by examiner

COMPOSITION AND PROCESS FOR PREPARING CURABLE ORGANOFLUORINE-MODIFIED POLYSILAZANES, AND POLYSILAZANES PREPARED THEREBY

STATEMENT OF PRIORITY

This application claims the priority of U.S. Provisional Application Nos. 61/221,574 and 61/221,575 filed Jun. 30, 2009, the contents of which are hereby incorporated by reference.

FIELD

This invention relates to curable polysilazane-containing compositions and, in other aspects, to compositions and processes for their preparation.

BACKGROUND

Ceramic materials are well-known and widely used for different applications due to some of their exceptional properties, such as relatively high modulus, hardness, high temperature stability, and/or chemical resistance. Ceramic materials can also be, however, relatively heavy, brittle, and/or difficult to process. Alternatively, organic polymers can be relatively tough, flexible, light, and/or easy to fabricate and process, but their relatively low modulus and relatively low decomposition temperatures prevent their use in some applications. Pre-ceramic polymer technology is emerging as a promising approach for producing materials that share the advantages of both polymers and ceramics, while minimizing the disadvantages.

Mixed organic/inorganic polymer compositions have been prepared (for example, by the hydrolysis of tetraalkoxysilanes containing polymerizable organic groups) to circumvent the insolubility of many important engineering polymers within sol-gel solutions. Curing of such sol-gel processed monomers has provided mixed systems exhibiting some of the properties of the organic components, as well as some of the properties of the inorganic components. Such mixed systems have typically comprised semi-interpenetrating networks composed of linear organic polymers and a three-dimensional silicon dioxide network.

Many polymers are known to act as ceramic precursors, and their use for production of ceramic structures has been reported. Polysilazanes and modified polysilazanes (for example, isocyanate-modified, isothiocyanate-modified, thiourea-modified, boron-modified, peroxide-modified, and amide-modified) have been prepared and used for pyrolytic conversion to a ceramic material (for example, silicon nitride). Polysilazanes have also been used to modify materials such as epoxy resins, phenolic resins, and polyamines.

Hybrid organic/inorganic polymers or ceramers (including hybrid polysilazane polymers or ceramers) have been prepared by the reaction of organic electrophiles with metal-containing polymers. The hybrid polymers are said to comprise organic segments derived from the organic electrophiles and inorganic fractions derived from segments of the metal-containing polymers. Such hybrid polymers have been proposed for use as coatings on substrate materials, for molding applications (with or without fillers), and for other polymer applications in which their hybrid properties (for example, a combination of relatively high mechanical strength and high temperature stability) can be advantageous.

SUMMARY

Thus, we recognize that there exists an ongoing need for hybrid organic/inorganic polymers or ceramers (and, in particular, hybrid polysilazane polymers or ceramers) that can meet the performance requirements of a variety of different applications (especially coating applications), as well as for efficient and cost-effective processes for their preparation. Such processes will preferably be capable of flexibly and controllably producing polymers having tailored structures and physical properties.

Briefly, in one aspect, this invention provides a composition for preparing curable organofluorine-modified polysilazanes. The composition comprises
  (a) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof; and
  (b) at least one fluorochemical compound comprising
    (1) at least one organofluorine or heteroorganofluorine moiety, and
    (2) at least one functional group that is capable of reacting with the curable oligomeric or polymeric polysilazane through at least one of the chemically reactive sites of the polysilazane.

Preferably, the organofluorine or heteroorganofluorine moiety of the fluorochemical compound is a perfluorinated moiety (more preferably, a perfluoroalkyl, perfluoroalkylene, perfluoroheteroalkyl, or perfluoroheteroalkylene moiety).

It has been discovered that a versatile new class of hybrid organic/inorganic polymers or ceramers can be produced, for example, by a relatively simple one-step reaction of inorganic or organic polysilazanes with functional group-containing fluorochemical compounds. In spite of its fluorochemical content, the composition of the invention surprisingly exhibits sufficient reactant compatibility to ensure reactivity. The resulting organofluorine-modified (that is, covalently modified by the organofluorine or heteroorganofluorine moiety) polysilazanes also surprisingly retain the curability of the starting polysilazanes and can be cured to form crosslinked networks.

The properties of the crosslinked networks can be tailored to the requirements of various different applications by varying the nature and relative amount of the starting polysilazane (for example, the chemical nature of its substituents, which determines its degree of organic content and the curing agents that can be effective) and the nature and relative amount of the starting fluorochemical compound (for example, the chemical nature and fluorine content of the organofluorine or heteroorganofluorine moiety). In particular, the organofluorine or heteroorganofluorine content of the starting fluorochemical compounds can be used to modify or tune the bulk and/or surface properties of the crosslinked networks for use in applications where the presence of fluorine can be advantageous (for example, applications requiring certain refractive index or low surface energy characteristics).

At least some of the resulting organofluorine-modified polysilazanes can therefore be useful as fluorinated surface treatments to impart a degree of hydrophobicity and/or oleophobicity to a variety of substrates (for example, for surface protection or to enhance ease of cleaning). In addition, the organofluorine-modified polysilazanes can be used in a number of other applications including, for example, use in molding applications (optionally in combination with at least one filler) to form various shaped articles, use in forming ceramic coatings, and so forth. Thus, at least some embodiments of the composition of the invention (and of the process of the invention described below) meet the above-described, ongoing need for hybrid organic/inorganic polymers or ceramers (and, in particular, hybrid polysilazane polymers or ceramers) that can fulfill the performance requirements of a variety of different applications (as well as the need for efficient and cost-effective preparation processes that can flexibly and controllably produce polymers having tailored structures and physical properties).

In another aspect, this invention also provides the above-referenced process for preparing the organofluorine-modified polysilazanes. The process comprises (a) combining
  (1) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof, and
  (2) at least one fluorochemical compound comprising
    (i) at least one organofluorine or heteroorganofluorine moiety, and
    (ii) at least one functional group that is capable of reacting with the curable oligomeric or polymeric polysilazane through at least one of the chemically reactive sites of the polysilazane; and
(b) allowing or inducing the curable oligomeric or polymeric polysilazane and the fluorochemical compound to react to form at least one curable organofluorine-modified polysilazane.

In further aspects, this invention provides a curable organofluorine-modified polysilazane prepared by the process of the invention, and the curable organofluorine-modified polysilazane in cured form.

DETAILED DESCRIPTION

In the following detailed description, various sets of numerical ranges (for example, of the number of carbon atoms in a particular moiety, of the amount of a particular component, or the like) are described, and, within each set, any lower limit of a range can be paired with any upper limit of a range.

DEFINITIONS

As used in this patent application:

"catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

"cure" means conversion to a crosslinked polymer network (for example, through irradiation or catalysis);

"fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

"fluorochemical" means fluorinated or perfluorinated;

"heteroorganic" means an organic group or moiety (for example, an alkyl or alkylene group) containing at least one heteroatom (preferably, at least one catenated heteroatom);

"mercapto" means a monovalent group or moiety of formula —SH;

"oligomer" means a molecule that comprises at least two repeat units and that has a molecular weight less than its entanglement molecular weight; such a molecule, unlike a polymer, exhibits a significant change in properties upon the removal or addition of a single repeat unit;

"perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine;

"perfluoroether" means a group or moiety having two saturated or unsaturated perfluorocarbon groups (linear, branched, cyclic (preferably, alicyclic), or a combination thereof) linked with an oxygen atom (that is, there is one catenated oxygen atom);

"perfluoropolyether group (or segment or moiety)" means a group or moiety having three or more saturated or unsaturated perfluorocarbon groups (linear, branched, cyclic (preferably, alicyclic), or a combination thereof) linked with oxygen atoms (that is, there are at least two catenated oxygen atoms);

"polysilazane" refers to compounds having at least one of a linear, branched, or cyclic main chain or backbone comprising a plurality of Si—N linkages;

"polysiloxazane" refers to compounds having at least one of a linear, branched, or cyclic main chain or backbone comprising both Si—N and Si—O linkages; for simplicity, in this patent application, "polysilazane" also includes "polysiloxazane" and "polyureasilazane";

"polyureasilazane" refers to compounds having at least one of a linear, branched, or cyclic main chain or backbone comprising a plurality of Si—N linkages and having at least one carbonyl group bonded to each of two nitrogen atoms;

"substituted aryl" group means an aryl group substituted by non-interfering (with cure) atoms such as one or more of halogens, alkyl groups, and heteroalkyl groups; and "sulfonamido" means a divalent group or moiety of formula —$SO_2N(R')$—, wherein R' is hydrogen or alkyl (for example, selected from alkyl groups having from one to about four carbon atoms).

Polysilazanes

Polysilazanes suitable for use in the composition of the invention include curable oligomeric or polymeric polysilazanes comprising at least one chemically reactive site selected from silicon-nitrogen bonds (or linkages), silicon-hydrogen bonds, carbon-carbon double bonds, and combinations thereof. The polysilazanes have main chains or backbones that comprise structural units having the following general formula:

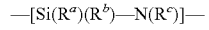  Formula I wherein each $R^a$, each $R^b$, and each $R^c$ is independently hydrogen, an organic group, a heteroorganic group, or a combination thereof. Suitable organic and heteroorganic groups include alkyl, alkenyl, cycloalkyl, aryl, aralkyl, alkylsilyl, arylsilyl, alkylamino, arylamino, alkoxy, aryloxy, aralkyloxy, and the like, and combinations thereof (preferably, alkyl, alkenyl, cycloalkyl, aryl, aralkyl, alkoxy, aryloxy, aralkyloxy, and combinations thereof); the groups preferably having from 1 to about 18 carbon atoms (more preferably, 1 to about 12 carbon atoms; even more preferably, 1 to about 8 carbon atoms; most preferably, 1 to about 2 carbon atoms (for example, methyl or vinyl)). The groups can be further substituted with one or more substituent groups such as halogen, alkoxy, amino, carboxyl, hydroxyl, alkoxycarbonyl, nitro, and the like, and combinations thereof. Preferably, the polysilazanes are liquids.

Useful polysilazanes include those having linear, branched, or cyclic structures, or a combination thereof, and/ or include those having number average molecular weights of about 100 to about 50,000 (preferably, about 200 to about 10,000). Modified polysilazanes such as polymetallosilazanes or silazane copolymers can be utilized. Useful polysilazanes include those that have random, alternating, or block polymer structures, or a combination thereof.

The polysilazanes can be prepared by methods that are known in the art. For example, polyorganosilazanes, as well as perhydropolysilazane (wherein all of $R^a$, $R^b$, and $R^c$ in Formula I above are hydrogen), can be prepared through ammonolysis of dichlorosilanes and, optionally, subsequent base-catalyzed dehydrogenative coupling. Polyorganosilazanes and perhydropolysilazane are also commercially available. The polysilazanes can be used in the composition of the invention singly or in the form of mixtures with one or more of themselves or with one or more other types of polymers.

Useful polysilazanes include those linear polysilazanes that can be represented by the following general formula:

$$—[Si(R^1)(R^2)—N(R^3)]_m—  \qquad \text{Formula II}$$

wherein each $R^1$ and each $R^2$ are independently hydrogen, a linear, branched, or cyclic alkyl group having fewer than about 9 carbon atoms, a linear, branched, or cyclic heteroalkyl group having fewer than about 7 carbon atoms, a substituted or unsubstituted aryl group having fewer than about 13 carbon atoms, an ethylenically unsaturated group, a ring structure formed from $R^1$ and $R^2$, taken together, having fewer than about 8 carbon atoms, or a combination thereof; each $R^3$ is independently hydrogen, a linear or branched alkyl group having fewer than about 7 carbon atoms, a linear or branched heteroalkyl group having fewer than about 7 carbon atoms, or a combination thereof; and m is a positive integer. Preferably, each $R^1$ and each $R^2$ are independently selected from hydrogen, methyl, phenyl, and vinyl, and each $R^3$ is preferably hydrogen. The number average molecular weight of the polysilazanes of Formula II can range from about 160 grams per mole to about 10,000 grams per mole (preferably from about 300 grams per mole to about 7,000 grams per mole; more preferably, from about 500 grams per mole to about 3,000 grams per mole; most preferably, from about 700 grams per mole to about 2,000 grams per mole).

Useful cyclic polysilazanes include those that can be represented by the following general formula:

$$\text{cyclo-}[Si(R^1)(R^2)—N(R^3)]_m— \qquad \text{Formula III}$$

wherein $R^1$, $R^2$, $R^3$, and m are as defined above for the polysilazanes of Formula II. The number average molecular weight of the cyclic polysilazanes of Formula III can range from about 160 grams per mole to about 3,000 grams per mole (preferably, from about 300 grams per mole to about 2000 grams per mole; more preferably, from about 350 grams per mole to about 1500 grams per mole). Other useful cyclic polysilazanes include those that comprise both linear and cyclic polysilazane moieties.

Useful branched polysilazanes include those generally represented by Formula II (linear polysilazanes with branches) or Formula III (cyclic polysilazanes with branches), where either or both of $R^1$ and $R^2$ in at least one of the repeat units of the polysilazanes have a structure that can be represented by the following general formula:

$$—[Si(R^4)—N(R^3)]_p—| \qquad \text{Formula IV}$$

wherein each $R^3$ is as defined above for Formula II, each $R^4$ is independently hydrogen, a linear, branched, or cyclic alkyl group having fewer than about 9 carbon atoms, a linear, branched, or cyclic heteroalkyl group having fewer than about 7 carbon atoms, a substituted or unsubstituted aryl group having fewer than about 13 carbon atoms, an ethylenically unsaturated group, or a combination thereof, and p is a positive integer that is generally smaller than m. Preferably, each $R^4$ is independently selected from hydrogen, methyl, phenyl, and vinyl, and each $R^3$ is preferably hydrogen. The number average molecular weight of the branched polysilazanes can range from about 160 grams per mole to about 3,000 grams per mole (preferably, from about 300 grams per mole to about 2000 grams per mole; more preferably, from about 350 grams per mole to about 1500 grams per mole). Other useful branched polysilazanes include those that comprise multiple branches and those that comprise cyclic polysilazane moieties.

Useful polysilazanes include linear polysiloxazanes that can be represented by the following general formula:

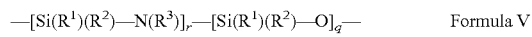

$$—[Si(R^1)(R^2)—N(R^3)]_r—[Si(R^1)(R^2)—O]_q— \qquad \text{Formula V}$$

wherein $R^1$, $R^2$, and $R^3$ are as defined above for Formula II; and r and q are positive integers (preferably, r is at least about 4 times the magnitude of q). Such polysiloxazanes can exhibit random, alternating, or block structures (or a combination thereof; preferably, a block structure) formed by the silazane (Si—N) and siloxane (Si—O) units. The number average molecular weight of the polysiloxazanes of Formula V can range from about 160 grams per mole to about 10,000 grams per mole (preferably, from about 300 grams per mole to about 7,000 grams per mole; more preferably, from about 500 grams per mole to about 3,000 grams per mole; most preferably, from about 700 grams pre mole to about 2,000 grams per mole).

Useful polysiloxazanes also include those that are cyclic or branched. Useful cyclic polysiloxazanes include polysiloxazanes that have cyclic portions that include Si—O linkages and polysiloxazanes in which the Si—O linkages are not in the cyclic portion. Useful branched polysiloxazanes include polysiloxazanes that are branched at either or both the Si—N and the Si—O linkages.

A particularly useful commercially available polysilazane, KION VL 20 (available from KION Corp, Huntington Valley, Pa.), has the following structure:

Formula VI

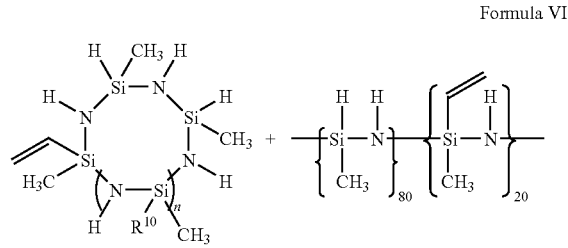

wherein n is an integer of 1-20, and $R^{10}$ is hydrogen or a vinyl group.

Useful polysilazanes further include linear polyureasilazanes that can be represented by the following general formula:

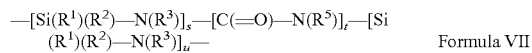

$$—[Si(R^1)(R^2)—N(R^3)]_s—[C(=O)—N(R^5)]_t—[Si(R^1)(R^2)—N(R^3)]_u— \qquad \text{Formula VII}$$

wherein $R^1$, $R^2$, and $R^3$ are as defined above for the polysilazanes of Formulas II and V; each $R^5$ is independently hydrogen or a linear, branched, or cyclic alkyl group having fewer than about 7 carbon atoms; and s, t, and u are positive integers (preferably, the sum of s and u is at least about 10 times the magnitude of t). The number average molecular weight of the polyureasilazanes of Formula VII can range from about 160 grams per mole to about 10,000 grams per mole (preferably, from about 300 grams per mole to about 7,000 grams per mole; more preferably, from about 500 grams per mole to about 3,000 grams per mole; most preferably, from about 700 grams per mole to about 2,000 grams per mole).

Useful polysilazanes also include cyclic polyureasilazanes that can be represented by the following general formula:

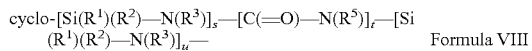
Formula VIII wherein $R^1$, $R^2$, $R^3$, $R^5$, s, t, and u are as defined above for the polysilazanes of Formula VII. The number average molecular weight of the cyclic polyureasilazanes of Formula VIII can range from about 160 grams per mole to about 3,000 grams per mole (preferably, from about 300 grams per mole to about 2000 grams per mole; more preferably, from about 350 grams per mole to about 1500 grams per mole). Other useful cyclic polyureasilazanes include those that comprise both linear and cyclic polyureasilazane moieties.

Useful branched polyureasilazanes include those generally represented by Formula VII (linear polyureasilazanes with branches) or Formula VIII (cyclic polyureasilazanes with branches), where either or both of $R^1$ and $R^2$ in at least one of the repeat units of the polyureasilazanes have the structure represented by Formula IV above.

Particularly preferred polysilazanes for use in the composition of the invention include those that can be represented by general Formula I above, in which each $R^a$ and each $R^b$ is independently selected from hydrogen, alkyl (preferably, methyl), alkenyl (preferably, vinyl), aryl (preferably, phenyl), and combinations thereof (preferably, at least one of $R^a$ and $R^b$ is hydrogen); and each $R^c$ is hydrogen. Such preferred polysilazanes include homopolymers or copolymers comprising one or more of the following units:

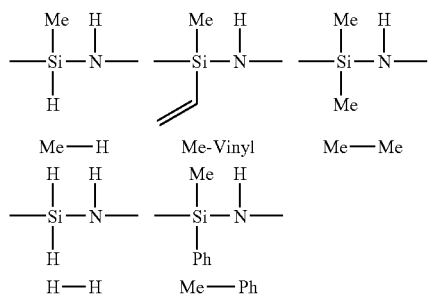

wherein Me is methyl and Ph is phenyl, as well as Vinyl-H units (that is, Me-H units wherein methyl is replaced with vinyl). The nature and amount of each such unit can vary widely, depending upon the particular application, the desired properties, and the preferred curing method (for example, if moisture curing is desired, at least some H—H content can be required). For example, useful copolymers can comprise Me-H and Vinyl-H units (for example, in a mole ratio of about 80 parts of Me-H to about 20 parts of Vinyl-H or about 60 parts of Me-H to about 40 parts of Vinyl-H); Me-H, Vinyl-H, and H—H units (for example, in a mole ratio of about 50 parts of Me-H to about 30 parts of Vinyl-H to about 20 parts of H—H); or Me-H and H—H units (for example, in a mole ratio of about 30 parts of Me-H to about 70 parts of H—H).

Fluorochemical Compounds

Fluorochemical compounds that are suitable for use in the composition of the invention include those that comprise (a) at least one organofluorine or heteroorganofluorine moiety and (b) at least one functional group that is capable of reacting with the above-described curable oligomeric or polymeric polysilazane through at least one of its chemically reactive sites (selected from silicon-nitrogen bonds, silicon-hydrogen bonds, carbon-carbon double bonds, nitrogen-hydrogen bonds, and combinations thereof). Preferably, the organofluorine or heteroorganofluorine moiety of the fluorochemical compound is a perfluorinated moiety (more preferably, a perfluoroalkyl, perfluoroalkylene, perfluoroheteroalkyl, or perfluoroheteroalkylene moiety).

A class of the fluorochemical compounds includes those that can be represented by the following general formula:

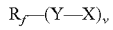

wherein $R_f$ is a monovalent or multivalent (preferably, monovalent or divalent) linear, branched, alicyclic, or aromatic, fluorinated or perfluorinated, organic or heteroorganic group or a combination thereof (preferably, a perfluorinated organic or heteroorganic group or a combination thereof; more preferably, a perfluoroalkyl, perfluoroalkylene, perfluoroether, or perfluoropolyether group or a combination thereof; even more preferably, a perfluoroalkyl, perfluoroalkylene, or perfluoropolyether group or a combination thereof; most preferably, a perfluoropolyether group); each Y is independently a covalent bond or a divalent linear, branched, alicyclic, or aromatic, organic or heteroorganic linking group or a combination thereof (preferably, a covalent bond or an alkylene or heteroalkylene group or a combination thereof; more preferably, a covalent bond, an alkylene group that optionally contains at least one catenated oxygen atom, a sulfonamido group, or a combination thereof); each X is independently an electrophilic or nucleophilic group (preferably, selected from isocyanato, isothiocyanato, epoxide, amino, oxazolino, hydroxyl, mercapto, vinyl, and hydrolyzable silyl groups (for example, silyl groups comprising at least one hydrolyzable moiety such as alkoxy or acyloxy), and combinations thereof; more preferably, selected from isocyanato, epoxide, amino, oxazolino, hydroxyl, and hydrolyzable silyl groups, and combinations thereof; most preferably, isocyanato, epoxide, amino, oxazolino, hydroxyl, and combinations thereof); and v is a positive integer that equals the valency of $R_f$ (preferably, one or two). Preferably, $R_f$ (which can be saturated or unsaturated; preferably, saturated) contains from about 3 to about 35 carbon atoms (more preferably, from about 4 to about 25 carbon atoms; most preferably, from about 6 to about 18 or 20 carbon atoms), and/or Y (which can be saturated or unsaturated; preferably, saturated) contains from about 0 to about 12 carbon atoms (more preferably, from about 1 to about 6 carbon atoms; most preferably, from about 1 to about 3 carbon atoms).

Preferred organofluorine or heteroorganofluorine moieties or $R_f$ groups include perfluoropolyether groups or segments that can be linear, branched, cyclic (preferably, alicyclic), or a combination thereof. The perfluoropolyether group or segment can be saturated or unsaturated (preferably, saturated). Representative examples of useful perfluoropolyether groups include, but are not limited to, those that have perfluorinated repeating units selected from —$(C_pF_{2p})$—, —$(C_pF_{2p}O)$—, —$(CF(Z))$—, —$(CF(Z)O)$—, —$(CF(Z)C_pF_{2p}O)$—, —$(C_pF_{2p}CF(Z)O)$—, —$(CF_2CF(Z)O)$—, and combinations thereof, wherein p is an integer of 1 to about 10 (preferably, 1 to about 8; more preferably, 1 to about 6; even more preferably, 1 to about 4; most preferably, 1 to about 3); Z is selected from perfluoroalkyl, perfluoroether, perfluoropolyether, and perfluoroalkoxy groups that are linear, branched, cyclic, or a combination thereof and that have less than or equal to about 12 carbon atoms (preferably, less than or equal to about 10 carbon atoms; more preferably, less than or equal to about 8 carbon atoms; even more preferably, less than or equal to about 6 carbon atoms; still more preferably, less than or equal to about 4 carbon atoms; most preferably, less than or equal to about 3 carbon atoms) and/or less than or equal to about 4 oxygen atoms (preferably, less than or equal to about 3 oxygen atoms; more preferably, less than or equal to about 2 oxygen atoms; most preferably, zero or one oxygen atom). In these perfluoropolyether structures, different repeating units can be combined in a block, alternating, or random arrangement to form the perfluoropolyether group.

When the perfluoropolyether group or segment is monovalent, its terminal group can be $(C_pF_{2p+1})$— or $(C_pF_{2p+1}O)$—, for example, wherein p is as defined above. Representative examples of useful monovalent perfluoropolyether groups include, but are not limited to, $C_3F_7O(CF(CF_3)CF_2O)_nCF(CF_3)$—, $C_3F_7O(CF_2CF_2CF_2O)_nCF_2CF_2$—, $CF_3O(C_2F_4O)_nCF_2$—, $CF_3O(CF_2O)_n(C_2F_4O)_qCF_2$— and $F(CF_2)_3O(C_3F_6O)_q(CF_2)_3$— (wherein n has an average value of 0 to about 50, about 1 to about 50, about 3 to about 30, about 3 to about 15, or about 3 to about 10; and q has an average value of 0 to about 50, about 3 to about 30, about 3 to about 15, or about 3 to about 10).

Representative examples of useful divalent perfluoropolyether groups include, but are not limited to, —$CF_2O(CF_2O)_n(C_2F_4O)_qCF_2$—, —$CF_2O(C_2F_4O)_qCF_2$—, —$(CF_2)_3O(C_3F_6O)_q(CF_2)_3$—, and —$CF(CF_3)(OCF_2CF(CF_3))_sOC_tF_{2t}O(CF(CF_3)CF_2O)_qCF(CF_3)$— (wherein n and q are as defined above; s has an average value of 0 to about 50, about 1 to about 50, about 3 to about 30, about 3 to about 15, or about 3 to about 10; the sum of q and s (that is, q+s) has an average value of 0 to about 50 or about 4 to about 40; the sum of q and n (that is, q+n) is greater than 0; and t is an integer of about 2 to about 6).

Preferably, the perfluoropolyether segment is monovalent or divalent, and/or the perfluoropolyether segment comprises at least one divalent hexafluoropropyleneoxy group (—CF(CF_3)—CF_2O—). Preferred perfluoropolyether segments include $F[CF(CF_3)CF_2O]_aCF(CF_3)$— (or, as represented above, $C_3F_7O(CF(CF_3)CF_2O)_nCF(CF_3)$, where n+1=a), wherein a has an average value of about 4 to about 20, and —$CF(CF_3)(OCF_2CF(CF_3))_bOCF_2CF_2CF_2CF_2O(CF(CF_3)CF_2O)_cCF(CF_3)$—, wherein b+c has an average value of about 4 to about 15. Such perfluoropolyether segments can be obtained through the oligomerization of hexafluoropropylene oxide and can be preferred because of their relatively benign environmental properties.

The fluorochemical compounds used in the composition of the invention can be prepared by various different known methods. For example, an organofluorine or heteroorganofluorine moiety-containing derivative (prepared, for example, by methods comprising electrochemical fluorination or direct fluorination of an organic starting compound, or comprising oligomerization of a perfluorinated monomer) such as a methyl (di)ester, a (di)acid chloride, or a (di)acid fluoride can be reacted with a functional group-containing compound (for example, an aminoalcohol) or reduced to a dihydroalcohol (for example, with sodium borohydride). Some of the fluorochemical compounds (for example, perfluoropolyether (di)acids, (di)esters, and (di)ols, as well as certain perfluoroalkanols) are also commercially available.

Perfluoropolyether-substituted, primary and secondary amine compounds suitable for use as fluorochemical compounds can be prepared by known methods. For example, a perfluoropolyether (as described above) derivative such as a methyl ester can be reacted with a diamine compound having at least one primary amino group (for example, a diaminoalkane having from about 2 to about 6 carbon atoms, such as 1,3-diaminopropane) under a nitrogen atmosphere.

Preferred perfluoropolyether derivatives for reaction with such diamines can be obtained by oligomerization of hexafluoropropylene oxide (HFPO). Such oligomerization provides a carbonyl fluoride derivative, which can be converted to a methyl ester or other derivative by known reactions (for example, those described in U.S. Pat. No. 3,250,808 (Moore et al.), the descriptions of which are incorporated herein by reference). The carbonyl fluoride derivative prepared by such oligomerization is in the form of a mixture of compounds of varying molecular weight having varying degrees of oligomerization (that is, the derivative is not synthesized as a single compound but as a mixture of compounds with different perfluoropolyether groups). Preferably, the mixture has a number average molecular weight of at least about 400 g/mole (more preferably, at least about 800 g/mole; most preferably, at least about 1000 g/mole). For example, the number average molecular weight of the mixture can be from 400 to 10000 g/mole, 800 to 4000 g/mole, or 1000 to 3000 g/mole.

Perfluoropolyether diacyl fluorides can be prepared by the photooxidative polymerization of tetrafluoroethylene (TFE), which results in the formation of perfluoropolyether polyperoxides. The perfluoropolyether polyperoxides can be reduced by physical techniques (for example, thermal or photochemical treatment) or by chemical techniques (for example, reduction with hydrogen in the presence of noble metal catalysts such as platinum or palladium). The reduction breaks the peroxidic perfluoropolyether bonds and can give perfluoropolyethers of lower molecular weight having —COF end groups and randomly-distributed difluoromethyleneoxy and tetrafluoroethyleneoxy moieties. This synthetic method is described in more detail, for example, in U.S. Patent Application Publication No. 2003/0013923 A1 (Marchionni et al.) and in U.S. Pat. No. 5,354,922 (Marchionni et al.), the descriptions of which are incorporated herein by reference.

Perfluoropolyether acyl fluorides can also be prepared by fluoride-catalyzed oligomerization of 1,1,2,2,-tetrafluorooxetane, followed by direct fluorination (as described, for example, in U.S. Pat. Nos. 4,904,417 and 4,845,268 (Ohsaka et al.), the description of which is incorporated herein by reference). These acyl fluorides can be converted to methyl esters by using the above-referenced procedures.

Preparation of Composition and Reaction Thereof to Form Curable Organofluorine-Modified Polysilazanes Curable organofluorine-modified polysilazanes can be prepared by a process comprising (a) forming the composition of the invention by combining (1) at least one of the above-described curable oligomeric or polymeric polysilazanes comprising at least one chemically reactive site, and (2) at least one of the above-described fluorochemical compounds comprising (i) at least one organofluorine or heteroorganofluorine moiety, and (ii) at least one functional group that is capable of reacting with the curable oligomeric or polymeric polysilazane through at least one of the chemically reactive sites; and (b) allowing or inducing the curable oligomeric or polymeric polysilazane and the fluorochemical compound of the composition to react to form at least one curable organofluorine-modified polysilazane.

For example, at least one polysilazane, at least one fluorochemical compound, and, optionally, at least one aprotic solvent (for example, xylene) can be combined in essentially any order in any suitable reactor (for example, a round bottom flask equipped with a magnetic stir bar, a reflux condenser, and a nitrogen inlet), which can then be stirred and heated to a desired reaction temperature (for example, about 23° C. to about 180° C.) under a dry (for example, nitrogen) atmosphere. Optionally, the reaction can be carried out in the presence of a catalyst (for example, an acidic or basic catalyst such as those described below in the section concerning moisture curing, or a catalyst described in U.S. Pat. No. 5,616,650 (Becker et al.), the catalyst descriptions of which are incorporated herein by reference). After the reaction has run to completion, the reactor can be cooled and vented, and the reactor contents can be removed and optionally further purified.

The relative amounts of the polysilazane and the fluorochemical compound can vary widely, depending upon the nature of the fluorochemical compound and the desired properties of the curable and/or cured organofluorine-modified polysilazane. For example, the one or more fluorochemical compounds can be present in the composition in total amounts from about 0.1 to about 50 percent by weight (preferably, from about 0.1 to about 40 percent by weight; more preferably, from about 1 to about 30 percent by weight; most preferably, from about 5 to about 30 percent by weight), based upon the total weight of the polysilazane(s) and the fluorochemical compound(s).

Suitable solvents for use in the composition of the invention include aprotic solvents such as aromatic solvents (for example, xylene, benzene, 1,2-dichlorobenzene, 1,3-dichlorobenzene, 1,4-dichlorobenzene, and the like, and mixtures thereof), ketones (for example, methylethyl ketone, cyclohexanone, and the like, and mixtures thereof), alkyl esters (for example, ethyl acetate, butyl acetate, and the like, and mixtures thereof), alkanes (for example, heptane, isoparaffinic hydrocarbons, and the like, and mixtures thereof), ethers (for example, t-butyl methyl ether, tetrahydrofuran (THF), and the like, and mixtures thereof), and the like, and mixtures thereof. Preferred solvents include aromatic solvents, alkanes, alkyl esters, and mixtures thereof; with xylene, heptane, ethyl acetate, and mixtures thereof being more preferred and xylene, heptane, and mixtures thereof most preferred.

Use and Curing of Curable Organofluorine-Modified Polysilazanes

The resulting curable organofluorine-modified polysilazanes can have relatively long shelf lives in the absence of moisture or catalyst (in the case of vinyl groups). The curable organofluorine-modified polysilazanes can be in the form of relatively viscous liquids that can be used alone or in admixture with each other or with commonly-used solvents (for example, alkyl esters, ketones, alkanes, aromatics, and the like, and mixtures thereof).

Minor amounts of optional components can be added to the curable polysilazanes to impart particular desired properties for particular curing methods or uses. Useful compositions can comprise conventional additives such as, for example, catalysts, initiators, surfactants, stabilizers, anti-oxidants, flame retardants, and the like, and mixtures thereof.

The curable organofluorine-modified polysilazanes (or a composition comprising, consisting, or consisting essentially thereof) can be used in various applications. For example, the curable organofluorine-modified polysilazanes can be used in molding applications (optionally in combination with at least one filler) to form various shaped articles, as ceramic precursors, and as fluorinated surface treatments. When used as fluorinated surface treatments, a degree of hydrophobicity and/or oleophobicity can be imparted to a variety of substrates (for example, for surface protection or to enhance ease of cleaning).

The curable organofluorine-modified polysilazanes (or a composition comprising, consisting, or consisting essentially thereof) can be cured by exposure to moisture (for example, if the polysilazanes have at least some H—H content, as described above), by the use of free radical initiators (for example, if the polysilazanes have at least some Me-Vinyl, Me-H, or H—H content, as described above), by the use of hydrosilation catalysts such as platinum catalysts (for example, if the polysilazanes have at least some Me-Vinyl, Me-H, or H—H content, as described above), or the like. The preferred curing method will vary, depending upon the particular application and its accompanying requirements and conditions.

Moisture cure can be effected at temperatures ranging from room temperature (for example, about 23° C.) up to about 80° C. or more, depending upon the degree of H—H content. Moisture curing times can range from a few minutes (for example, at the higher temperatures) to hours (for example, at the lower temperatures).

Useful moisture curing catalysts are well-known in the art and include ammonia, N-heterocyclic compounds (for example, 1-methylpiperazine, 1-methylpiperidine, 4,4'-trimethylenedipiperidine, 4,4'-trimethylene-bis(1-methylpiperidine), diazobicyclo[2.2.2]octane, cis-2,6-dimethylpiperazine, and the like, and combinations thereof), mono-, di-, and trialkylamines (for example, methylamine, dimethylamine, trimethylamine, phenylamine, diphenylamine, triphenylamine, DBU (that is, 1,8-diazabicyclo[5.4.0]-7-undecene), DBN (that is, 1,5-diazabicyclo[4.3.0]-5-nonene), 1,5,9-triazacyclododecane, 1,4,7-triazacyclononane, and the like, and combinations thereof), organic or inorganic acids (for example, acetic acid, propionic acid, butyric acid, valeric acid, maleic acid, stearic acid, hydrochloric acid, nitric acid, sulfuric acid, phosphoric acid, chloric acid, hypochlorous acid, and the like, and combinations thereof), metal carboxylates, metal acetylacetonate complexes, metal powders, peroxides, metal chlorides, organometallic compounds, and the like, and combinations thereof. Preferred moisture curing catalysts include ammonia, DBU, 4,4'-trimethylene-bis(1-methylpiperidine), and combinations thereof.

When used, the moisture curing catalysts can be present in amounts ranging from about 0.1 to about 10 weight percent (preferably, from about 0.1 to about 5 weight percent; more preferably, from about 0.1 to about 2 weight percent), based upon the total weight of catalyst and curable organofluorine-modified polysilazane. The catalysts can be added before, during, or after reaction of the polysilazane and the fluorochemical compound to form the organofluorine-modified polysilazane (for curing purposes, preferably after) and can be activated at low temperatures (for example, to enable room temperature curing, as described above).

Suitable free radical initiators include organic and inorganic peroxides; alkali metal persulfates; ammonium persulfate; redox systems; aliphatic azo compounds; organic and inorganic peroxides in combination with metal or amine compounds as activators; and the like, and combinations thereof. Preferred free radical initiators include organic and inorganic peroxides (for example, hydrogen peroxide and acyl or aryl peroxides such as p-menthane hydroperoxide, ethyl ketone peroxide, benzoyl peroxide, lauroyl peroxide, tert-butyl peroxybenzoate, acetyl benzyl peroxide, p-chlorobenzoyl peroxide, alkoxy benzoyl peroxide, dicaproyl peroxide, crotonyl peroxide, di-tert-alkyl peroxide, di-tertbutyl diphosphate peroxide, peracetic acid, cyclohexyl hydroperoxide, dicumyl peroxide, and the like, and combinations thereof); and combinations thereof.

When used, the free radical initiators can be present in amounts ranging from about 0.1 to about 10 weight percent (preferably, from about 1 to about 5 weight percent), based upon the total weight of initiator and curable organofluorine-modified polysilazane. The free radical initiators can be added before, during, or after (preferably, after) reaction of the polysilazane and the fluorochemical compound to form the organofluorine-modified polysilazane and can be activated by the heat of their reaction (in some cases) or by radiation or thermal energy from an external source (for example, convection heating, induction heating, or electron beam or microwave irradiation). For example, free radically-initiated curing can be effected by heating to a temperature of about 150° C. for a period of minutes to hours (for example, about 18 hours).

Suitable hydrosilation catalysts include thermal catalysts (for example, platinum catalysts) and photocatalysts that can be effective for catalyzing a hydrosilation reaction between silicon-bonded hydrogen groups and silicon-bonded ethylenic groups. Useful thermal hydrosilation catalysts include those described, for example, in U.S. Pat. Nos. 2,823,218 (Speier et al.); 2,970,150 (Bailey); 3,159,601 and 3,159,662 (Ashby); 3,220,972 (Lamoreaux); 3,516,946 (Modic); 3,814,730 (Karstedt); 4,029,629 (Jeram); 4,533,575 and 4,504,645 (Melancon); and 5,741,552 (Takayama, et al.); the catalyst descriptions of which are incorporated herein by reference. Useful photocatalysts include those described, for example, in U.S. Pat. Nos. 4,510,094 and 4,530,879 (Drahnak); and 5,145,886 (Oxman et al.); the catalyst descriptions of which are incorporated herein by reference. Useful hydrosilation catalysts and techniques also include those described in U.S. Pat. No. 5,520,978 (Boardman et al.); the hydrosilation catalyst and technique descriptions of which are incorporated herein by reference. Combinations of thermal catalysts and photocatalysts can be used.

When used, the hydrosilation catalyst can typically be present in an amount that is effective to catalyze the hydrosilation reaction (for example, in amounts ranging from about 1 to about 1000 parts per million (ppm); preferably, from about 10 to about 500 ppm; more preferably, from about 50 to about 250 ppm), based upon the total weight of catalyst and curable organofluorine-modified polysilazane. The catalyst can be added before, during, or after (preferably, after) reaction of the polysilazane and the fluorochemical compound to form the organofluorine-modified polysilazane and can be activated by the heat of their reaction (in some cases) or by radiation (for example, ultraviolet-visible light, gamma irradiation, e-beam, or the like) or thermal energy from an external source (for example, convection heating, induction heating, irradiation, or the like). For example, platinum catalyzed curing can be effected by heating to a temperature of about 120° C. for a period of about seconds to minutes.

The curable organofluorine-modified polysilazanes can be cured to form crosslinked hardcoats. The hardcoats can exhibit hybrid properties that can be tailored by varying the degree of crosslinking and by varying the natures and relative amounts of the starting polysilazane and the starting fluorochemical compound.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

All solvents were standard reagent grade obtained from commercial sources and were used without further purification unless specified otherwise.

Preparation of Polysilazane (PS1)

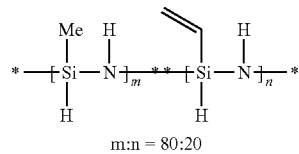

m:n = 80:20

A 2-liter, 3-necked flask equipped with a mechanical stirrer, a dry ice (that is, solid carbon dioxide)/acetone condenser, and an ammonia inlet tube was charged with hexane (800 mL), methyldichlorosilane (57.7 g, obtained from Alfa Aesar, Ward Hill, Mass.) and vinylmethyldichlorosilane (17.4 g, obtained from Alfa Aesar, Ward Hill, Mass.). Ammonia (obtained from Matheson Tri Gas, Baking Ridge, N.J.) was then slowly bubbled into the resulting mixture, and the temperature of the mixture increased. After 30 g ammonia was consumed, the reaction went slowly and some ammonia was refluxed. The reaction continued until 35 g of ammonia had been added. A resulting salt was collected on a filter. Evaporation of solvent from the resulting filtrate gave 28 g of viscous polysilazane.

Preparation of Polysilazane (PS2)

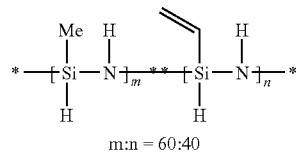

m:n = 60:40

A 5-liter, 3-necked flask equipped with a mechanical stirrer, a dry ice/acetone condenser, and an ammonia inlet tube was charged with hexane (2000 mL), methyldichlorosilane (172.5 g, obtained from Alfa Aesar, Ward Hill, Mass.), and vinylmethyldichlorosilane (141 g, obtained from Alfa Aesar, Ward Hill, Mass.). Ammonia (obtained from Matheson Tri Gas, Baking Ridge, N.J.) was then slowly bubbled into the resulting mixture, and the temperature of the mixture increased. After 143 g ammonia had been added, the reaction was stopped. A resulting salt was collected on a filter. Evaporation of solvent from the resulting filtrate gave 150 g of viscous polysilazane.

Preparation of Polysilazane (PS3)

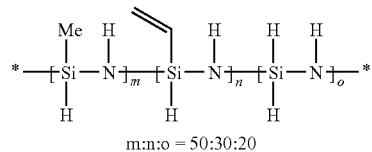

m:n:o = 50:30:20

A 2-liter, 3-necked flask equipped with a mechanical stirrer, a dry ice/acetone condenser, and an ammonia inlet tube was charged with hexane (1250 mL) and dichlorosilane (121.2 g, 0.3 mole, 25 weight percent solution in xylene, obtained from Gelest, Morrisville, Pa.). Pyridine (0.6 mole, 47.5 g, obtained from Aldrich Chemical Company, Milwaukee, Wis.) was then slowly added to the flask. Methyldichlorosilane (0.5 mole, 57.5 g, obtained from Alfa Aesar, Ward Hill, Mass.) and vinylmethyldichlorosilane (0.2 mole, 28.2 g, obtained from Alfa Aesar, Ward Hill Mass.) were next added to the flask. Ammonia (obtained from Matheson Tri Gas, Baking Ridge, N.J.) was then slowly bubbled into the resulting mixture, and the temperature of the mixture increased. After 65 g of ammonia had been added, the reaction was stopped. A resulting salt was collected on a filter. Evaporation of solvent from the resulting filtrate gave 63 g of viscous polysilazane.

Preparation of Polysilazane (PS4)

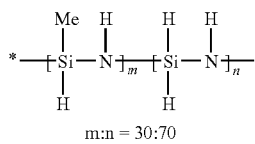

m:n = 30:70

A 2-liter, 3-necked flask equipped with a mechanical stirrer, a dry ice/acetone condenser, and an ammonia inlet tube was charged with hexane (1000 mL) and dichlorosilane (0.42 mole, 169.7 g, 25 weight percent solution in xylene, obtained from Gelest, Morrisville, Pa.). Pyridine (0.84 mole, 66.4 g, obtained from Aldrich Chemical Company, Milwaukee, Wis.) was then slowly added to the flask. Methyldichlorosilane (0.18 mole, 20.7 g, obtained from Alfa Aesar, Ward Hill, Mass.) was next added to the flask. Ammonia (obtained from Matheson Tri Gas, Baking Ridge, N.J.) was then slowly bubbled into the resulting mixture, and the temperature of the mixture increased. After 35 g of ammonia had been added, the reaction was stopped. A resulting salt was collected on a filter. Evaporation of solvent from the resulting filtrate gave 16.9 g of viscous polysilazane.

Preparation of $F(CF(CF_3)CF_2O)_aCF(CF_3)C(=O)OCH_3$, wherein a Averaged 6.7

Unless otherwise noted, "HFPO—" refers to the monovalent end group $F(CF(CF_3)CF_2O)_aCF(CF_3)$— of the methyl ester $F(CF(CF_3)CF_2O)_aCF(CF_3)C(=O)OCH_3$, wherein "a" averaged about 6.7, and the methyl ester had an average molecular weight of about 1,211 g/mole. This methyl ester was prepared by essentially the method described in U.S. Pat. No. 3,250,808 (Moore et al.), the description of this method being incorporated herein by reference, with purification by fractional distillation.

This methyl ester was converted to the amidol HFPO—C(=O)NHCH$_2$CH$_2$OH by treatment with monoethanolamine, essentially as described in U.S. Patent Application Publication No. 2005/0250921 (Qiu et al) on pages 6 and 7 under the procedure for FC-4.

Preparation of 2-HFPO-Oxazoline

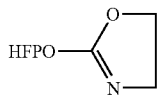

114 g (about 0.1 mole) HFPO—C(=O)NHCH$_2$CH$_2$OH (prepared as described above) was dissolved in 20 mL C$_4$F$_9$OCH$_3$ (commercially available from 3M Company, St. Paul, Minn., as NOVEC™ Engineered Fluid HFE-7100), treated with 10 mL SOCl$_2$, and the resulting mixture heated at reflux for 18 hours. The mixture was then stripped of solvent, and the resulting residue was heated for 10 hours at about 100° C. to give HFPO—C(=O)NHCH$_2$CH$_2$Cl, 20.0 g of which was slurried in about 25 mL CH$_3$OH containing 4.0 g of 25 weight percent NaOCH$_3$ in CH$_3$OH (obtained from Aldrich Chemical Company, Milwaukee, Wis.). After 20 hours at 23° C., the slurry was quenched in water and extracted with C$_4$F$_9$OCH$_3$ to yield 15.0 g 2-HFPO-oxazoline as a low-viscosity liquid. Nuclear magnetic resonance (NMR) and infrared (IR) analysis supported the structure.

Preparation of HFPO-Dihydroalcohol Glycidyl Ether

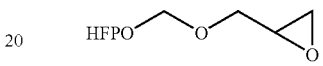

HFPO—C(=O)OCH$_3$ (prepared as described above) was reduced using sodium borohydride to prepare HFPO—CH$_2$OH, which was then alkylated with allyl bromide to form HFPO—CH$_2$OCH$_2$CH=CH$_2$ essentially as described in Example 1 of U.S. Pat. No. 7,294,731 (Flynn et al.).

13.0 g HFPO—CH$_2$OCH$_2$CH=CH$_2$ was dissolved in 15 mL t-butyl methyl ether and treated with 4 g of meta-chloroperbenzoic acid (mCPBA). A sample of the treated mixture was isolated for nuclear magnetic resonance (NMR) analysis by quenching an aliquot in 5 mL perfluoro-N-methylmorpholine (commercially available from 3M Company St. Paul, Minn., under trade designation PF5052), filtering, and concentrating. NMR revealed greater than 90 percent residual allyl groups. Another 2.0 g mCPBA was added to the mixture, and the mixture was heated on a steam bath for two hours. NMR showed 28 percent residual allyl groups. Another 3.0 g mCPBA was added to the mixture, and the mixture was stirred at reflux for 20 hours. The mixture was quenched in perfluoro-N-methylmorpholine, filtered, and concentrated to the desired glycidyl ether (6.8 g), a colorless oil.

Preparation of 2-(Perfluoropentyl)oxazoline

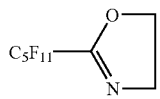

1 mole each of C$_5$F$_{11}$COOCH$_3$ (made by electrofluorination of hexanoyl chloride and subsequent reaction with methanol, 82 percent linear C$_5$F$_{11}$) and NH$_2$C$_2$H$_4$OH was heated in methanol (about 200 mL) for 18 hours at 55-60° C. and stripped to provide 355.3 g C$_5$F$_{11}$CONHC$_2$H$_4$OH, 100 g of which was treated cautiously with 25 mL SOCl$_2$ (obtained from Aldrich Chemical Company, Milwaukee, Wis.), heated for 18 hours at 55-60° C., and stripped to provide 102.1 g C$_5$F$_{11}$CONHC$_2$H$_4$Cl, 37.5 g of which was dissolved in 100 mL methanol and treated with 6.0 g powdered NaOH. After stirring the resulting mixture for 20 hours at 23° C., the mixture was quenched in water, extracted with dichloromethane, and dried over MgSO$_4$. Distillation of the dried mixture yielded 15.0 g pure C$_5$F$_{11}$-oxazoline as a colorless liquid (boiling point 170° C.).

Preparation of 1,1-Dihydroperfluorobutyl Glycidyl Ether

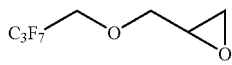

800 g (4.0 mole) C$_3$F$_7$CH$_2$OH (obtained from Aldrich Chemical Company, Milwaukee, Wis.), 840 g (9.1 moles) epichlorohydrin (obtained Aldrich Chemical Company, Milwaukee, Wis.), 5 g ADOGEN 464 phase transfer catalyst (methyltrialkyl(C$_8$-C$_{10}$)ammonium chloride, obtained from Aldrich Chemical Company, Milwaukee, Wis.) and 1 liter tetrahydrofuran (THF) were stirred while adding dropwise 320 g 50 weight percent NaOH. The resulting reaction mixture exothermed to 37° C. and was then kept at 60° C. for 17 hours. The THF was stripped, and the resulting residue was washed with 1 liter of water. The resulting lower organic layer was dissolved in dichloromethane, rewashed with water, and then stripped and distilled to 307 g (boiling point 70° C. at 0.0013 atmosphere pressure).

Preparation of N-Glycidyl-N-Methylperfluorobutanesulfonamide

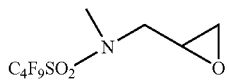

313 g C$_4$F$_9$SO$_2$NHCH$_3$, prepared essentially according to Example 1 of U.S. Pat. No. 6,664,354 (Savu et al.), was added to 220 g 25 weight percent NaOCH$_3$ in CH$_3$OH in about 100 mL CH$_3$OH plus about 250 mL toluene in a 3-necked reaction flask. The solvents were stripped, and the resulting paste was dissolved in 250 mL tetrahydrofuran (THF) and treated with 400 mL (5.1 mole) epichlorohydrin. After stirring the resulting mixture for 4 hours at 80° C., gas-liquid chromatography (GLC) showed the reaction to be complete. The mixture was cooled, washed with water, and the resulting lower organic layer dissolved in dichloromethane, dried over MgSO$_4$, filtered, and concentrated. Distillation gave a forerun of unreacted epichlorohydrin and the desired glycidyl derivative as a colorless liquid (boiling point 95-105° C.), 260.8 g.

Preparation of Perfluoropoly(methyleneoxide-co-ethyleneoxide)bis(dihydroalcohol)bis(glycidyl ether)

The corresponding diallyl ether (where LTM represents a divalent perfluoropolyether group having the structure —CF$_2$O(CF$_2$O)$_n$(C$_2$F$_4$O)$_q$CF$_2$—, commercially available as a diol having an equivalent weight of 950 from Solvay Solexis, Houston, Tex.) was prepared essentially as described in Example 3 of U.S. Pat. No. 7,294,731 (Flynn et al.) and epoxidized with excess meta-chloroperbenzoic acid (mCPBA) in essentially the same manner as described above for the HFPO-dihydroalcohol allylether, to provide a colorless oil.

Preparation of N-(2-Aminoethyl)-N-methylperfluorobutanesulfonamide

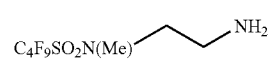

N-Methylperfluorobutanesulfonamide (626 g, 2 moles, prepared essentially according to Example 1 of U.S. Pat. No. 6,664,354 (Savu et al.)), 2-ethyl-2-oxazoline (198 g, 2 moles, obtained from Alfa Aesar, Ward Hill, Mass.), and sodium carbonate (17 g, 0.16 mole, obtained from EMD Chemicals, Gibbstown, N.J.) were combined and heated for 16 hours at 140° C. to form N-(2-(N-methylperfluorobutanesulfonamide)ethyl)propionamide. This amide was twice extracted with 250 mL deionized water, heated for 18 hours at 100° C. with a mixture of 250 mL concentrated hydrochloric acid and 100 mL deionized water, extracted with 925 mL of 24 weight percent aqueous sodium hydroxide solution, extracted with 250 mL 10 weight percent aqueous sodium hydroxide solution, and distilled to provide N-(2-aminoethyl)-N-methylperfluorobutanesulfonamide (538 g; 75 percent recovery; 94 percent pure by gas chromatography (GC); distilled at 104-109° C. under 0.0026 atmosphere pressure).

Preparation of Monoadduct of Methylenediphenyl-4,4'-diisocyanate and N-Methyl-N-hydroxyethylperfluorobutanesulfonamide

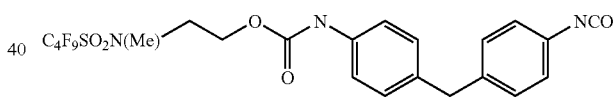

This compound was prepared essentially according to the process described in column 12, lines 40-54, of U.S. Pat. No. 7,345,123 (Qiu et al.).

Preparation of N-3(Trimethoxysilyl)propyl HFPO-carboxamide

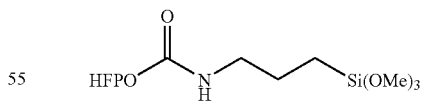

To a 1 liter round bottom flask was added 500 g (0.40255 mole) HFPO—C(=O)OCH$_3$ (prepared as described above) and 72.11 g (0.040225 mole) aminopropyl trimethoxysilane. The flask was heated to an internal temperature of 75° C. overnight in an oil bath and was monitored by Fourier transform infrared spectroscopy for disappearance of a peak at about 1790 cm$^{-1}$ and appearance of a peak at about 1710 cm$^{-1}$. The resulting mixture was then placed under a vacuum of about 0.0013 atmosphere at room temperature for 48 hours.

Example 1

A solution of

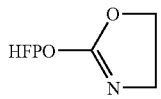

(0.2 g; prepared as described above) and polysilazane PS1 (2 g; prepared as described above) in xylene (2 g) was heated to 130° C. for 4 hours. When the resulting homogenous solution was cooled to room temperature, two layers formed. The solution was diluted with 12 g of ethyl acetate. Then, 0.0136 g of dicumyl peroxide was added to 5 g of the solution, and the resulting solution was coated on an aluminum plate and cured at 150° C. for 18 hours.

Example 2

Example 2 was carried out in essentially the same manner as Example 1, except that

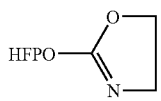

was replaced with 0.2 g of

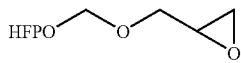

(prepared as described above).

Example 3

A solution of

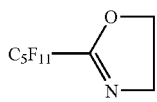

(0.8 g; prepared as described above) and polysilazane PS1 (2 g; prepared as described above) was heated to 130° C. for 1 hour, resulting in a homogenous solution. 0.0136 g of dicumyl peroxide was added to 0.68 g of the homogeneous solution, and the resulting solution was coated on an aluminum plate and cured at 150° C. for 18 hours.

Example 4

Example 4 was carried out in essentially the same manner as Example 3, except that

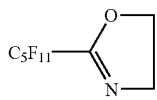

was replaced with

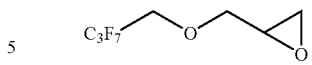

(0.8 g; prepared as described above). Nuclear magnetic resonance (NMR) analysis of the resulting product suggested incorporation of the epoxide with ring opening to provide one or both of the following structures:

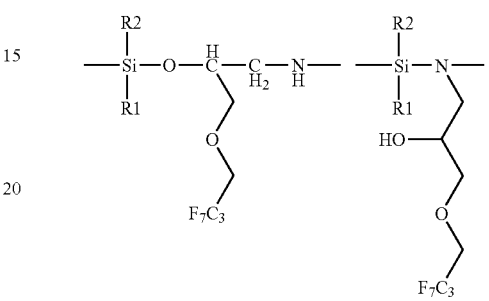

Example 5

Example 5 was carried out in essentially the same manner as Example 3 except that

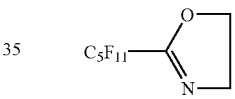

was replaced with

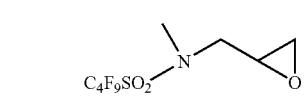

(0.8 g: prepared as described above).

Example 6

Example 6 was carried out in essentially the same manner as Example 1, except that

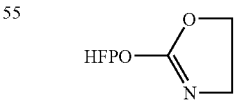

was replaced with

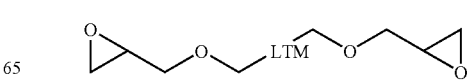

(0.2 g; prepared as described above) and a hazy solution, instead of a homogeneous solution, was obtained.

Example 7

A solution of

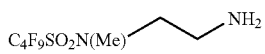

(0.8 g; prepared as described above) and polysilazane PS1 (2 g; prepared as described above) was heated to 130° C. for 2 hours, resulting in a homogenous solution. 0.07 g of dicumyl peroxide was added to the homogeneous solution, and the resulting solution was coated on an aluminum plate and cured at 150° C. for 18 hours.

Example 8

A solution of

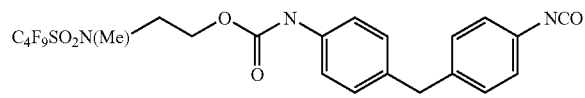

(0.1 g; prepared as described above) and polysilazane PS1 (2 g; prepared as described above) was heated to 130° C. for 4 hours, resulting in a homogenous solution. To the homogenous solution, 0.042 g of dicumyl peroxide was added, and the resulting solution was coated on an aluminum plate and cured at 200° C. for 18 hours.

Example 9

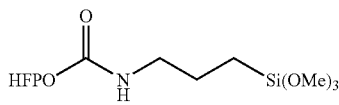

(prepared as described above; number average molecular weight, $M_n$, about 1400; 0.1 g) and polysilazane PS1 (prepared as described above; 1 g) were combined and heated to 130° C. for 4 hours, and then 0.035 g of dicumyl peroxide was added to the resulting solution. The solution was coated on an aluminum plate and cured at 150° C. for 8 hours.

Example 10

$CF_3(CF_2)_3CH_2CH_2OH$ (0.1 g; commercially available from Aldrich Chemical Company, Milwaukee, Wis.) and polysilazane PS1 (1 g; prepared as described above) were combined and heated to 130° C. for 4 hours, and then 0.035 g of dicumyl peroxide was added to the combination. The resulting solution was coated on an aluminum plate and cured at 150° C. for 8 hours.

Example 11

A solution of

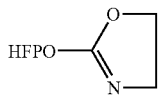

(0.2 g; prepared as described above) and polysilazane PS1 (2 g; prepared as described above) in xylene (2 g) was heated to 130° C. for 4 hours. When the resulting homogenous solution was cooled to room temperature, two layers were formed. This solution was diluted with ethyl acetate (12 g), and 0.364 g of 0.373 weight percent $Pt(0)\text{-}Me_2Si(CH\!\!=\!\!CH_2)_2$ in toluene was added to 2 g of the solution. The resulting solution was coated on an aluminum plate and cured at 120° C. for 5 hours.

Example 12

Example 12 was carried out in essentially the same manner as Example 11, except that

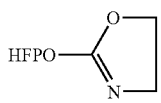

was replaced with 0.2 g of

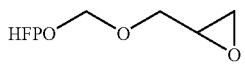

(prepared as described above).

Example 13

A solution of

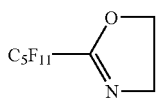

(0.8 g; prepared as described above) and polysilazane PS1 (2 g; prepared as described above) was heated to 130° C. for 1 hour, resulting in a homogenous solution. 0.272 g of the solution was mixed with 1.728 g of ethyl acetate and 0.364 g of 0.373 weight percent $Pt(0)\text{-}Me_2Si(CH\!\!=\!\!CH_2)_2$ (in toluene) solution. The resulting solution was coated on an aluminum plate and cured at 120° C. for 4.5 hours.

Example 14

Example 14 was carried out in essentially the same manner as Example 13, except that

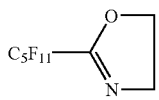

was replaced with 0.8 g of

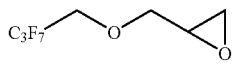

(prepared as described above).

Example 15

Example 15 was carried out in essentially the same manner as Example 13, except that

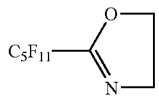

was replaced with 0.8 g

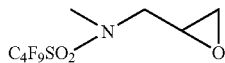

(prepared as described above).

Example 16

Example 16 was carried out in essentially the same manner as Example 11, except that

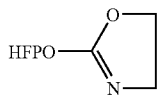

was replaced with 0.2 g of

(prepared as described above).

Example 17

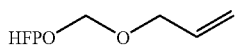

(0.1 g; prepared as described above), polysilazane PS1 (1 g; prepared as described above), 0.22 g of 0.373 weight percent Pt(0)-Me$_2$Si(CH=CH$_2$)$_2$ in toluene, and t-butyl methyl ether (2 g) were mixed to form a clear solution. The solution was coated on an aluminum plate and cured at 120° C. for 5 hours.

Example 18

A solution of

(0.2 g; prepared as described above) and polysilazane PS2 (2 g; prepared as described above) in xylene (2 g) was heated to 130° C. for 4 hours, resulting in a hazy solution, which, when cooled to room temperature, formed two layers. The solution was then diluted with ethyl acetate (12 g), and 0.036 g of dicumyl peroxide was added to 5 g of the diluted solution. The solution was coated on an aluminum plate and cured at 150° C. for 18 hours.

Example 19

A solution of

(0.2 g; prepared as described above) and polysilazane PS2 (2 g; prepared as described above) in xylene (2 g) was heated to 130° C. for 4 hours, resulting in a hazy solution, which, when cooled to room temperature, formed two layers. The solution was diluted with t-butyl methyl ether (12 g), and 0.364 g of 0.373 weight percent Pt(0)-Me$_2$Si(CH=CH$_2$)$_2$ in toluene was added to 2 g of the diluted solution. The solution was coated on an aluminum plate and cured at 120° C. for 16 hours.

Example 20

A solution of

(0.08 g; prepared as described above) and polysilazane PS3 (2 g; prepared as described above) in xylene (2 g) was heated to 130° C. for 10 hours, resulting in a hazy solution, which, when cooled to room temperature, formed two layers. The solution was diluted with t-butyl methyl ether (13.3 g) to form a clear solution. 1 g of the clear solution (0.116 g solid) was mixed with 0.013 g 1,8-diazabicyclo[5.4.0]-7-undecene (DBU, obtained from ICI America, Portland, Oreg.) and coated on aluminum plates. The resulting coatings dried to touch within minutes after the solvent had evaporated (in contrast with a corresponding coating without DBU). Some of the dried coatings were further cured at room temperature; some were further cured at 70° C. for 2 days; some were further cured at 80° C.; some were further cured at 150° C.

Example 21

A solution of

(0.08 g; prepared as described above) and polysilazane PS4 (2 g; prepared as described above) in xylene (2 g) was heated to 130° C. for 10 hours, resulting in a hazy solution, which, when cooled to room temperature, formed two layers. The solution was diluted with ethyl acetate (12 g) to form a clear solution. 1 g of the clear solution (0.116 g solid) was mixed with 0.013 g 1,8-diazabicyclo[5.4.0]-7-undecene (DBU, obtained from ICI America, Portland, Oreg.) and coated on aluminum plates. The resulting coatings solidified very quickly (in contrast with a corresponding coating without DBU) at 70° C.

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows.

We claim:

1. A composition comprising
   (a) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof; and
   (b) at least one fluorochemical compound comprising
      (1) at least one organofluorine or heteroorganofluorine moiety, and
      (2) at least one functional group that is capable of reacting with said curable oligomeric or polymeric polysilazane through at least one said chemically reactive site;
   wherein said fluorochemical compound is one of a class that is represented by the following general formula:

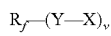

$R_f$—(Y—X)$_v$ wherein $R_f$ is a monovalent or multivalent linear, branched, alicyclic, or aromatic, fluorinated or perfluorinated, organic or heteroorganic group or a combination thereof; each Y is independently a covalent bond or a divalent linear, branched, alicyclic, or aromatic, organic or heteroorganic linking group or a combination thereof; each X is independently an electrophilic or nucleophilic group selected from isocyanato, isothiocyanato, epoxide, amino, oxazolino, mercapto, vinyl, and combinations thereof; and v is a positive integer that equals the valency of $R_f$.

2. The composition of claim 1, wherein said polysilazane has a main chain comprising structural units having the following general formula:

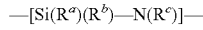

—[Si($R^a$)($R^b$)—N($R^c$)]—  Formula I wherein each said $R^a$, each said $R^b$, and each said $R^c$ is independently hydrogen, an organic group, a heteroorganic group, or a combination thereof.

3. The composition of claim 2, wherein said organic and heteroorganic groups are selected from alkyl, alkenyl, cycloalkyl, aryl, aralkyl, alkylsilyl, arylsilyl, alkylamino, arylamino, alkoxy, aryloxy, aralkyloxy, and combinations thereof and/or wherein said organic and heteroorganic groups have from 1 to 18 carbon atoms.

4. The composition of claim 2, wherein each said $R^a$ and each said $R^b$ is selected from hydrogen, alkyl, alkenyl, aryl, and combinations thereof; and each said $R^c$ is hydrogen.

5. The composition of claim 4, wherein said alkyl is methyl, said alkenyl is vinyl, and said aryl is phenyl.

6. The composition of claim 1, wherein said polysilazane is a liquid; and/or wherein said polysilazane has a linear, branched, or cyclic structure, or a combination thereof, and/or has a number average molecular weight of 100 to 50,000.

7. The composition of claim 1, wherein said organofluorine or heteroorganofluorine moiety of said fluorochemical compound is a perfluorinated moiety.

8. The composition of claim 1, wherein said organofluorine or heteroorganofluorine moiety of said fluorochemical compound is a perfluoroalkyl, perfluoroalkylene, perfluoroheteroalkyl, or perfluoroheteroalkylene moiety.

9. The composition of claim 1, wherein said $R_f$ contains from 3 to 35 carbon atoms; and/or wherein said $R_f$ is monovalent or divalent and said v is one or two.

10. The composition of claim 1, wherein said $R_f$ is a perfluorinated organic or heteroorganic group or a combination thereof.

11. The composition of claim 10, wherein said perfluorinated organic or heteroorganic group is selected from perfluoroalkyl, perfluoroalkylene, perfluoroether, perfluoropolyether, and combinations thereof.

12. The composition of claim 1, wherein said $R_f$ group is a perfluoroalkyl or perfluoroalkylene group.

13. The composition of claim 1, wherein said $R_f$ group is a perfluoropolyether group.

14. The composition of claim 13, wherein said perfluoropolyether group is monovalent or divalent, and/or said perfluoropolyether group comprises at least one divalent hexafluoropropyleneoxy group (—CF(CF$_3$)—CF$_2$O—); and/or wherein said perfluoropolyether group is selected from F[CF(CF$_3$)CF$_2$O]$_a$CF(CF$_3$)—, wherein a has an average value of about 4 to about 20, and —CF(CF$_3$)(OCF$_2$CF(CF$_3$))$_b$OCF$_2$CF$_2$CF$_2$CF$_2$O(CF(CF$_3$)CF$_2$O)$_c$CF(CF$_3$)—, 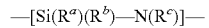 wherein b+c has an average value of about 4 to about 15.

15. The composition of claim 1, wherein said Y is a covalent bond or an alkylene or heteroalkylene group or a combination thereof and/or wherein said X is selected from isocyanato, epoxide, amino, oxazolino, and combinations thereof.

16. A composition comprising
   (a) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof, wherein said polysilazane has a main chain comprising structural units having the following general formula:

—[Si($R^a$)($R^b$)—N($R^c$)]—  Formula I wherein each said $R^a$ and each said $R^b$ is selected from hydrogen, alkyl, alkenyl, aryl, and combinations thereof and each said $R^c$ is hydrogen; and
   (b) at least one fluorochemical compound comprising
      (1) at least one organofluorine or heteroorganofluorine moiety selected from perfluoroalkyl, perfluoroalkylene, perfluoroether, and perfluoropolyether, and
      (2) at least one functional group that is capable of reacting with said curable oligomeric or polymeric polysilazane through at least one said chemically reactive site, said functional group being selected from isocyanato, isothiocyanato, epoxide, amino, oxazolino, mercapto, vinyl, and combinations thereof.

17. A process comprising
(a) combining
    (1) at least one curable oligomeric or polymeric polysilazane comprising at least one chemically reactive site selected from silicon-nitrogen bonds, silicon-hydrogen bonds, carbon-carbon double bonds, nitrogen-hydrogen bonds, and combinations thereof, and
    (2) at least one fluorochemical compound comprising
        (i) at least one organofluorine or heteroorganofluorine moiety, and
        (ii) at least one functional group that is capable of reacting with said curable oligomeric or polymeric polysilazane through at least one said chemically reactive site,
    wherein said fluorochemical compound is one of a class that is represented by the following general formula:

$R_f-(Y-X)_v$ wherein $R_f$ is a monovalent or multivalent linear, branched, alicyclic, or aromatic, fluorinated or perfluorinated, organic or heteroorganic group or a combination thereof; each Y is independently a covalent bond or a divalent linear, branched, alicyclic, or aromatic, organic or heteroorganic linking group or a combination thereof; each X is independently an electrophilic or nucleophilic group selected from isocyanato, isothiocyanato, epoxide, amino, oxazolino, mercapto, vinyl, and combinations thereof; and v is a positive integer that equals the valency of $R_f$; and
(b) allowing or inducing said oligomeric or polymeric polysilazane and said fluorochemical compound to react to form at least one curable organofluorine-modified polysilazane.

18. The process of claim 17, wherein said process further comprises at least partially curing said curable organofluorine-modified polysilazane.

* * * * *

UNITED STATES PATENT AND TRADEMARK OFFICE
CERTIFICATE OF CORRECTION

PATENT NO. : 8,324,324 B2
APPLICATION NO. : 12/792065
DATED : December 4, 2012
INVENTOR(S) : Yu Yang It is certified that error appears in the above-identified patent and that said Letters Patent is hereby corrected as shown below:

In the Claims:

Column 25,
Line 66, Claim 3, delete "thereof" and insert -- thereof; --, therefor.

Column 26,
Line 43, Claim 16, delete "thereof" and insert -- thereof; --, therefor.

Signed and Sealed this
Seventh Day of May, 2013

Teresa Stanek Rea
*Acting Director of the United States Patent and Trademark Office*